US011984005B2

(12) United States Patent
Sciancalepore et al.

(10) Patent No.: US 11,984,005 B2
(45) Date of Patent: May 14, 2024

(54) METHOD AND SYSTEM FOR SUPPORTING PASSIVE INTRUSION DETECTION IN INDOOR ENVIRONMENTS

(71) Applicant: NEC Laboratories Europe GmbH, Heidelberg (DE)

(72) Inventors: Vincenzo Sciancalepore, Heidelberg (DE); Francesco Devoti, Heidelberg (DE); Xavier Costa-Perez, Heidelberg (DE)

(73) Assignee: NEC CORPORATION, Tokyo (JP)

(*) Notice: Subject to any disclaimer, the term of this patent is extended or adjusted under 35 U.S.C. 154(b) by 21 days.

(21) Appl. No.: 17/628,273

(22) PCT Filed: Jan. 29, 2020

(86) PCT No.: PCT/EP2020/052176
§ 371 (c)(1),
(2) Date: Jan. 19, 2022

(87) PCT Pub. No.: WO2021/018417
PCT Pub. Date: Feb. 4, 2021

(65) Prior Publication Data

US 2022/0277631 A1 Sep. 1, 2022

(30) Foreign Application Priority Data

Aug. 1, 2019 (EP) .................................... 19189684

(51) Int. Cl.
*G08B 13/24* (2006.01)
*G08B 29/18* (2006.01)

(52) U.S. Cl.
CPC ....... *G08B 13/2491* (2013.01); *G08B 29/186* (2013.01)

(58) Field of Classification Search
CPC ............. G08B 13/2491; G08B 13/187; H05B 47/115; G01S 13/56; Y02B 20/40
See application file for complete search history.

(56) References Cited

U.S. PATENT DOCUMENTS

| | | | | | |
|---|---|---|---|---|---|
| 8,730,087 | B2 | 5/2014 | Filippi et al. | | |
| 9,185,528 | B2 | 11/2015 | Schwartz et al. | | |
| 2003/0098791 | A1 | 5/2003 | Carlson et al. | | |
| 2004/0223056 | A1* | 11/2004 | Norris, Jr. | H04N 7/18 | 348/143 |
| 2005/0156743 | A1* | 7/2005 | Gallivan | F41H 13/0068 | 340/541 |
| 2010/0045457 | A1* | 2/2010 | Krill | G08B 29/188 | 340/539.22 |

(Continued)

FOREIGN PATENT DOCUMENTS

WO WO 02082004 A2 10/2002

*Primary Examiner* — Mirza F Alam
(74) *Attorney, Agent, or Firm* — Leydig, Voit & Mayer, Ltd.

(57) ABSTRACT

A method passively detects intrusion in an indoor environment. The method includes: establishing at least one communication channel between two millimeter (mm)-wave devices of a plurality of mm-wave devices deployed within the indoor environment, continuously monitoring communication channel parameters of the at least one communication channel, and triggering an intrusion detection process based on variations of the communication channel parameters.

16 Claims, 8 Drawing Sheets

(56) References Cited

U.S. PATENT DOCUMENTS

| | | | | |
|---|---|---|---|---|
| 2015/0302712 | A1 | 10/2015 | Rosa et al. | |
| 2018/0158299 | A1* | 6/2018 | Bogdan | H04N 23/56 |
| 2022/0026531 | A1* | 1/2022 | Wu | G01S 13/88 |

* cited by examiner a)

b)

(a) Different neurons (b) Different layers

METHOD AND SYSTEM FOR SUPPORTING PASSIVE INTRUSION DETECTION IN INDOOR ENVIRONMENTS

CROSS REFERENCE TO RELATED APPLICATIONS

This application is a U.S. National Phase application under 35 U.S.C. § 371 of International Application No. PCT/EP2020/052176, filed on Jan. 29, 2020, and claims benefit to European Patent Application No. EP 19189684.4, filed on Aug. 1, 2019. The International Application was published in English on Feb. 4, 2021 as WO 2021/018417 A1 under PCT Article 21(2).

FIELD

The present invention relates to a method and a system for passively detecting intrusion in an indoor environment.

BACKGROUND

Intrusion detection is important for improving safety, for instance, for private house, public offices and specific areas. In general, intrusion detection systems are configured to signal the presence of intruders and to trigger an alarm capable of preventing any theft and/or damage by outsiders. Several commercial solutions are currently available by means of different technologies. Typically, such solutions require ad-hoc systems installed to detect and identify threats.

For instance, WO 02/082004 A2 discloses a dedicated device for motion detection that comprises an incoherent detector and a sensing element, which operates at millimeter wavelength. The dedicated device exploits the output of the incoherent detection to detect movements and trigger an alarm.

U.S. Pat. No. 8,730,087 B2 discloses a passive radar for presence and motion detection. More specifically, presence and motion of intruders is detected passively by means of TM-UWB radars. This requires at least two Tm-UWB radars which are displaced according to the area to be protected and which monitor the changes in the propagation environment to detect the presence of an intruder and track its movement.

U.S. Pat. No. 9,185,528 B2, which relates to Wi-Fi mapping and motion detection, discloses methods and systems that rely on a plurality of transceivers positioned so as to transmit and receive signals that pass through a portion of an area of interest. Movements of persons in the area of interest are determined by using the strength of the received signals and prior knowledge of building characteristics.

US 2003/0098791 A1 discloses a wireless security sensor system for windows and doors. The sensor, which is to be installed, e.g., in a window frame, monitors the window opening by means of a magnetic sensor, whose output is processed by a microprocessor and transmitted via an RF transmitter which enables wireless connectivity to the sensor.

In J. Palacios, et al.: "Communication-driven localization and mapping for millimeter wave networks", in *Proceedings of IEEE Conference on Computer Communications* (*INFOCOM*) 2018, the authors propose a 'Simultaneous Localization And Mapping' (SLAM) algorithm which exploits beam-training to retrieve angle-difference-of-arrival information. This information is used to estimate the location of the mmWave APs and the position of the user in the surrounding indoor environment. The proposed solution requires that the user device is connected to a mmWave AP.

The inventors have recognized that those intrusion detection solutions discussed above prove to be disadvantageous in terms of certain aspects. In particular, the solutions have a common shortcoming, namely that they require the deployment of an ad hoc apparatus for detecting any intrusive behavior.

SUMMARY

In an embodiment, the present disclosure provides a method that passively detects intrusion in an indoor environment. The method includes: establishing at least one communication channel between two millimeter (mm)-wave devices of a plurality of mm-wave devices deployed within the indoor environment, continuously monitoring communication channel parameters of the at least one communication channel, and triggering an intrusion detection process based on variations of the communication channel parameters.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
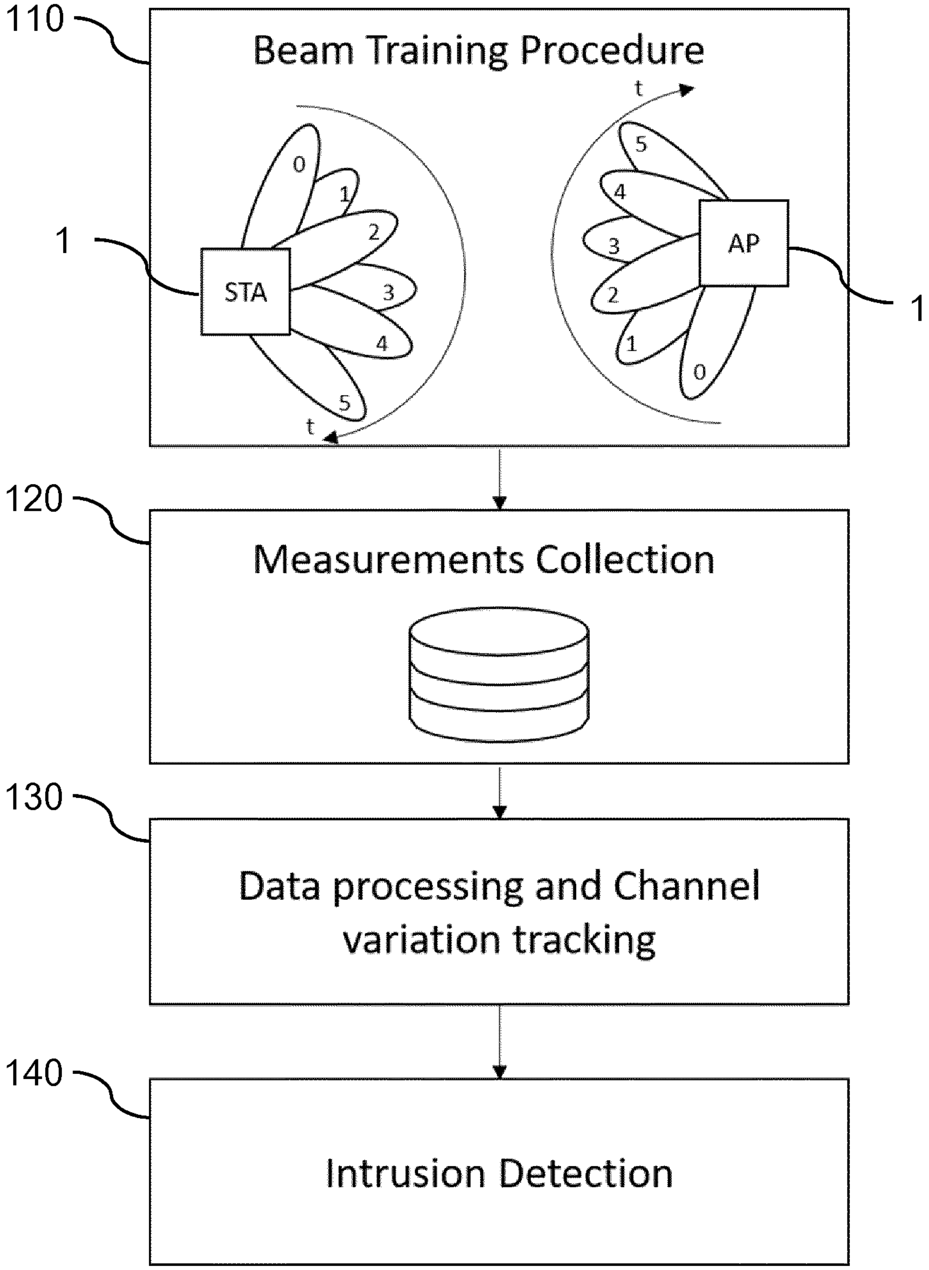
FIG. 1 is a schematic diagram illustrating the general workflow of an intrusion detection system in accordance with embodiments of the invention.

Embodiments of the present invention improve and further develop a method and a system for passively detecting intrusion in an indoor environment in such a way that intrusion detection can be efficiently performed without the need of a dedicated apparatus.

An embodiment of the present invention provide a method for passively detecting intrusion in an indoor environment, the method including: establishing at least one communication channel between two mm-wave devices of a number of mm-wave devices deployed within the indoor environment, continuously monitoring communication channel parameters, and using variations of the communication channel parameters to trigger an intrusion detection process.

An embodiment of the present invention provides a system for passively detecting intrusion in an indoor environment, where a number of millimeter (mm)-wave devices is deployed within the indoor environment, and where at least one communication channel is established between two mm-wave devices of the number of mm-wave devices. The system includes a control unit having one or more processors, which, alone or in combination, are configured to provide for execution of the following steps:

continuously monitoring communication channel parameters, and using variations of the communication channel parameters to trigger an intrusion detection process.

According to embodiments of the invention, the mm-waves communication channel through off-the-shelf routers are exploited to continuously monitor propagation environment changes so as to detect intrusions. Specifically, intrusion detection capabilities and intrusion tracking capabilities may be provided via beamforming. In contrast to solutions discussed above, embodiments of the present invention do not require ad-hoc systems to detect an intrusion. In particular, embodiments may rely on the high penetration rate of the mm-waves devices in the societal behaviors, such as home routers, smart TVs, wearable VR Gaming Headsets, etc. This novel technology is widely deployed in private houses, offices and indoor environments, but so far has only been used to provide connectivity with very high capacity to deliver customized services. Embodiments of the present invention pioneers the novel concept of passive intrusion detection by exploiting the directivity property of mm-waves antennas and the high-sensibility to environmental changes of the mm-waves communication channels.

Embodiments of the present invention implement a passive channel variation detection process that relies on a directive mm-waves communication between two or more devices in an indoor scenario (based on beamforming alignment process). According to further embodiments of the present invention, a deep neural network may be configured that adaptively learns the statistical distribution of the measurements in a specific environment and promptly identifies whenever there is a significant change, i.e., an intrusion.

In an exemplary embodiment, a method for passively detecting intrusion in an indoor environment comprises the steps of establishing a connection between two or more mm-waves devices deployed in an indoor scenario. Channel parameters, such as RSSI and/or SNR, between each pair of mm-waves device beams are continuously monitored. A neural network may be trained with statistical parameters of the channel measurements in a reference scenario as well as when the environment is occupied by one (or more) intruders. The neural network may be fed with collected data, such as RSSI or SNR, and an alert indicative of an intrusion may be triggered when an environmental change is detected.

There are several ways how to design and further develop the teachings of embodiments of the present invention in an advantageous way. To this end it is to be referred to the following explanation of exemplary embodiments of the present invention by way of example, illustrated by the figures. In connection with the explanation of the preferred embodiments of the present invention by the aid of the figures, generally exemplary embodiments and further developments of the teaching will be explained.

As 5G deployments start to roll-out, indoor solutions are increasingly pressed towards delivering an enhanced performance, convenience, security, and user experiences not possible with today's connectivity solutions. Wi-Fi is the predominant technology of choice indoors and major vendors started addressing this need by incorporating the mmWave band to their products. Specifically, with more than 80% of mobile data traffic originating or terminating indoors, service providers aiming at keeping pace with 5G are increasingly considering the mmWave technology for indoor locations as the solution to bring current WiFi products to the next level. As such, it is expected that mmWave devices will become pervasive in the near future. mmWave can elevate user experiences to new heights by bringing multi-Gigabit/s speeds, ultra-low latency experiences, and virtually unlimited capacity to a wide range of devices such as smartphones, tablets, AR/VR (augmented/virtual reality) headsets, and always-connected laptops.

On the standardization side, the IEEE 802.11ad working group, also known as WiGig, already defined a solution delivering high-speed communication capabilities for devices operating in the mmWave frequency bands. Based on this standard, commercial off-the-shelf products are available today. The future IEEE 802.11ay standard (for reference, see IEEE P802.11ay, "Enhanced throughput for operation in license-exempt bands above 45 GHz," IEEE 802.11 Working Group, Mar. 2019), currently under development, is being designed to provide up to 30 Gbit/s of indoor capacity within 30 meters (for reference, see Y. Ghasempour, C. R. C. M. da Silva, C. Cordeiro, and E. W. Knightly, "IEEE 802.11ay: Next-generation 60 GHz communication for 100 Gb/s Wi-Fi," IEEE Communications Magazine, vol. 55, no. 12, pp. 186-192, December 2017).

The high data rates offered by mmWave systems compared to classical sub-6 GHz Wi-Fi ones come at the price of much worse propagation properties. Attenuation is very strong at mmWave frequencies and thus, mmWave devices require a larger number of antenna elements so as to provide high spatial processing gains that compensate for experienced pathloss (for reference, see K. Haneda et al, "A statistical spatio-temporal radio channel model for large indoor environments at 60 and 70 GHz," IEEE Transactions on Antennas and Propagation, vol. 63, no. 6, pp. 2694-2704, June 2015). These multiple antenna elements enable mmWave transmitters to electronically steer the radiation pattern providing spatial diversity to the communication channel. Moreover, strong multi-path features and high obstacle blockage sensitivity make mmWave communications very sensible to propagation environment changes.

With the above in mind, embodiments of the present invention relate to intrusion detection methods and systems that take advantage of the unique properties of mmWave communication channels to perform indoor intrusion detection in a passive manner, in addition to enable Gigabit/s data rates.

In particular, mmWaves can easily pass through common clothing materials and reflect on human bodies. Such reflected waves result in frequency variations that reveal discrepancies from expected communication channel properties measurements (e.g., power, noise, etc.). Thereby, detecting the potential presence of an unexpected person in an indoor environment. In order to do so, according to embodiments, a data analytics engine can carefully parse the monitored data and capture mmWave channel variations. Deep neural networks can then automatically learn the reference channel environment of a given mmWave indoor deployment and, if an unexpected channel variation is detected, recognize whether it is due to the presence of an intruder. Furthermore, the directional nature of the mmWave signal enables a localization feature by sounding the channel on different directions and determining the position of intruders without requiring any active connection.

FIG. 1 illustrates a general system workflow according to an embodiment of the present invention. As already mentioned above, the new technology utilized by the present invention relies on mm-waves communication channels and is conventionally called Wi-Gig based on the standard IEEE 802.11ad. In particular, Wi-Gig-enabled devices (sometimes herein also referred to as mmWave devices) work at high frequency with 60 GHz bandwidth. The devices are equipped with antenna arrays that provide directional communication capabilities to the devices while focusing the communication towards a particular direction based on the beam pattern. Different beam patterns are properly defined in devices' codebooks, as will be appreciated by those skilled in the art.

Each Wi-Gig devices pair has to establish a connection through a pair of beams that are activated during the communication, as exemplarily depicted at 110 in FIG. 1 for a pairwise connection between a first mmWave device 1 (denoted STA) and a second mmWave device 1 (denoted AP). The beam pattern selection is made by means of a beam training phase, wherein devices take measurements of the received power provided by each beam in the codebooks. Based on such measurements, devices are able to select the best beam that is used for future communications with a respective other device.

Millimeter wave propagation is strongly influenced by the propagation environment itself, thus the presence of an intruder can radically change the propagation conditions, which translates into changes in measurements outcome of the beam training phase. Therefore, according to embodiments of the invention, the measurements taken during the beam training phase are exploited to directionally sense the propagation environment. Embodiments of the invention can exploit the power measurements performed by mm-waves devices during standard operations. These measurements may be utilized to detect propagation environment changes and to passively sense intrusions in the area under intrusion control.

According to a further embodiment of the invention, a further functionality is added, which makes Wi-Gig devices capable of providing intrusion detection service to work alongside the connectivity provisioning. In addition, propagation environment changes may be mapped into other emergency situations, such as water leakage, fire, which can be advertised in time to allow emergency recovery.

In a preferred embodiment of the present invention, multiple (e.g., at least two) Wi-Gig devices are statically deployed within the indoor environment that is to be controlled in terms of intrusion detection. Furthermore, at least two of the multiple the Wi-Gig devices establish a successful connection between each other. For example, as shown in FIG. 1, the deployed Wi-Gig devices may include a Wi-Gig access point (AP) providing connectivity for another Wi-Gig device acting as a station (STA), such as a smart TV. However, as will be easily appreciated by those skilled in the art, this requirement does not prevent the access point from regularly providing connectivity to other devices placed in the environment following normal connection procedures.

Those devices perform the beam training phase according to the IEEE 802.11ad standard protocol, as shown at 110 in FIG. 1, and the measurements performed during the beam training are then collected (as shown at 120) and processed to track the channel variations per each transmit-receive (tx-rx) beam pair (as shown at 130). Measurement values might include (but not limited to) power measurements, received-signal-strength-indicator (RSSI), signal-to-noise-ratio (SNR). The statistical mm-waves channel variation is then used to trigger the intrusion detection process, as shown at 140 in FIG. 1.

Different propagation environments may provide distinct channel statistics. If an intruder breaks into the area, this will automatically change the measurement statistics. Against this background, according to embodiments of the invention, the measurement statistics are continuously monitored and, in case of detecting a change of those statistics, the presence of an intruder in the respective area under surveillance (e.g., a room) can be inferred and eventually an alarm can be triggered.

Figure 2:
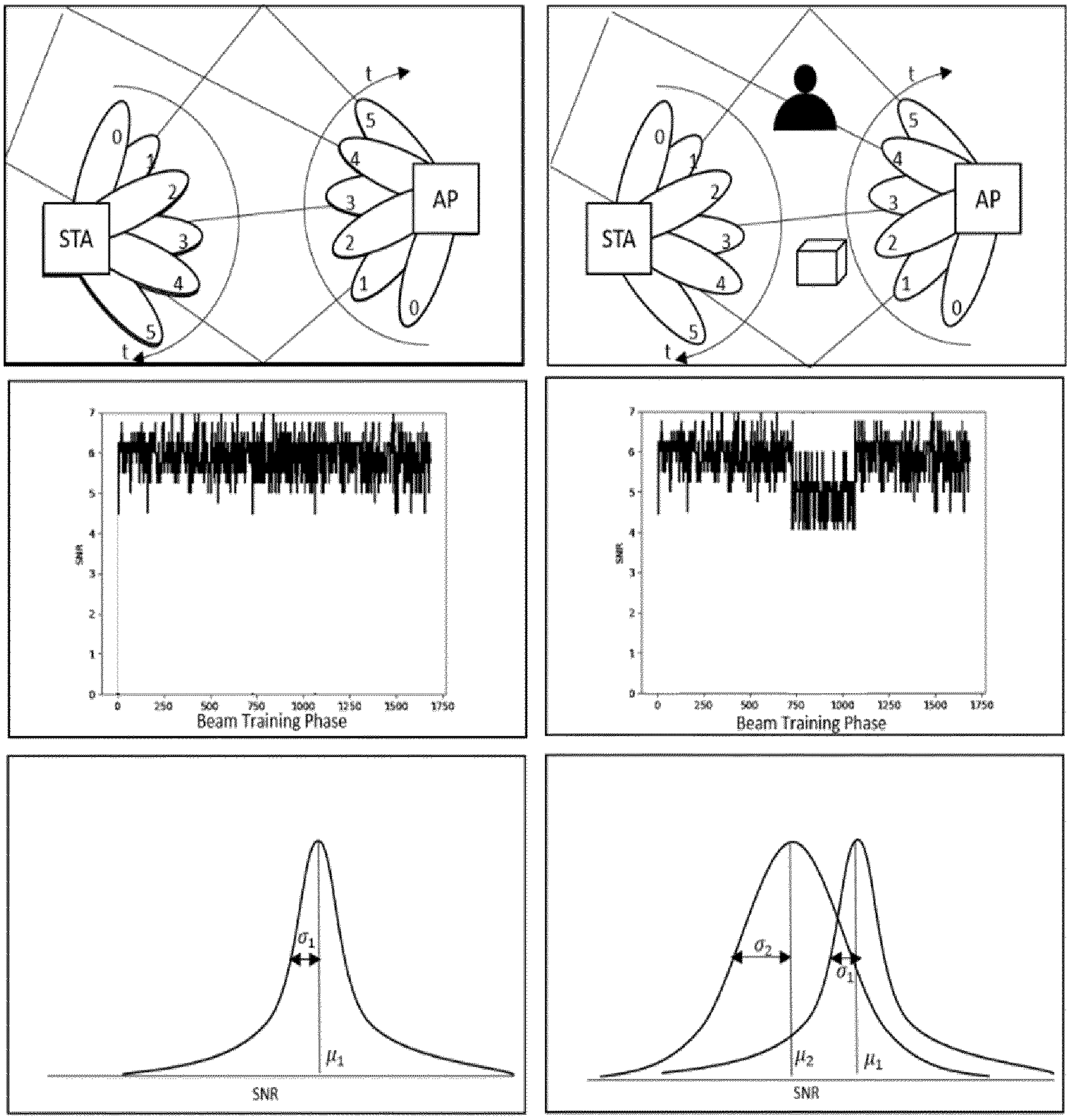
FIGS. 2*a*) and 2*b*) are a diagram showing statistical distributions of received power in an intrusion detection system according to the present invention, considering an empty environment (left side) and an occupied environment (right side)

FIG. 2 schematically illustrates an overview of a channel statistic measurement process according to an embodiment of the invention. While part a) on the left side relates to the case of a static environment without any intrusion, part b) on the right side relates to the present of an intruder moving in the respective room.

The upper diagrams of FIG. 2 schematically illustrate the beam training phase of two Wi-Gig devices, STA and AP. Each of the devices has six different beam characteristics (denoted '0'-'5'). The diagrams in the middle of FIG. 2 illustrate an example of a series of SNR measurements for a given couple of transmitting and receiving codebook activation. Statistics are collected over time and statistical distributions are drawn to properly monitor the environment, as shown in the lower diagrams of FIG. 2.

From the diagrams on the right side, the effect of the presence of an intruder moving in the room under surveillance can be obtained. Such an intruder in the covered environment perturbates the propagation environment and this, in turn, is translated into a noticeable difference in the measured SNR for a given couple of activated beams. Different beam pairs provide different statistics showing a distinct sensibility to the environmental changes in different areas of the room depending on their beam pattern. Embodiments of the invention consider the Beam training measurements per each activated beam pair taken in different time windows. While constructing the statistical distribution, a change in the distribution parameters will be detected, such as the mean value $\mu$ or the variance $\sigma$ of the SNR, which might lead to an intrusion detection event.

Figure 3:
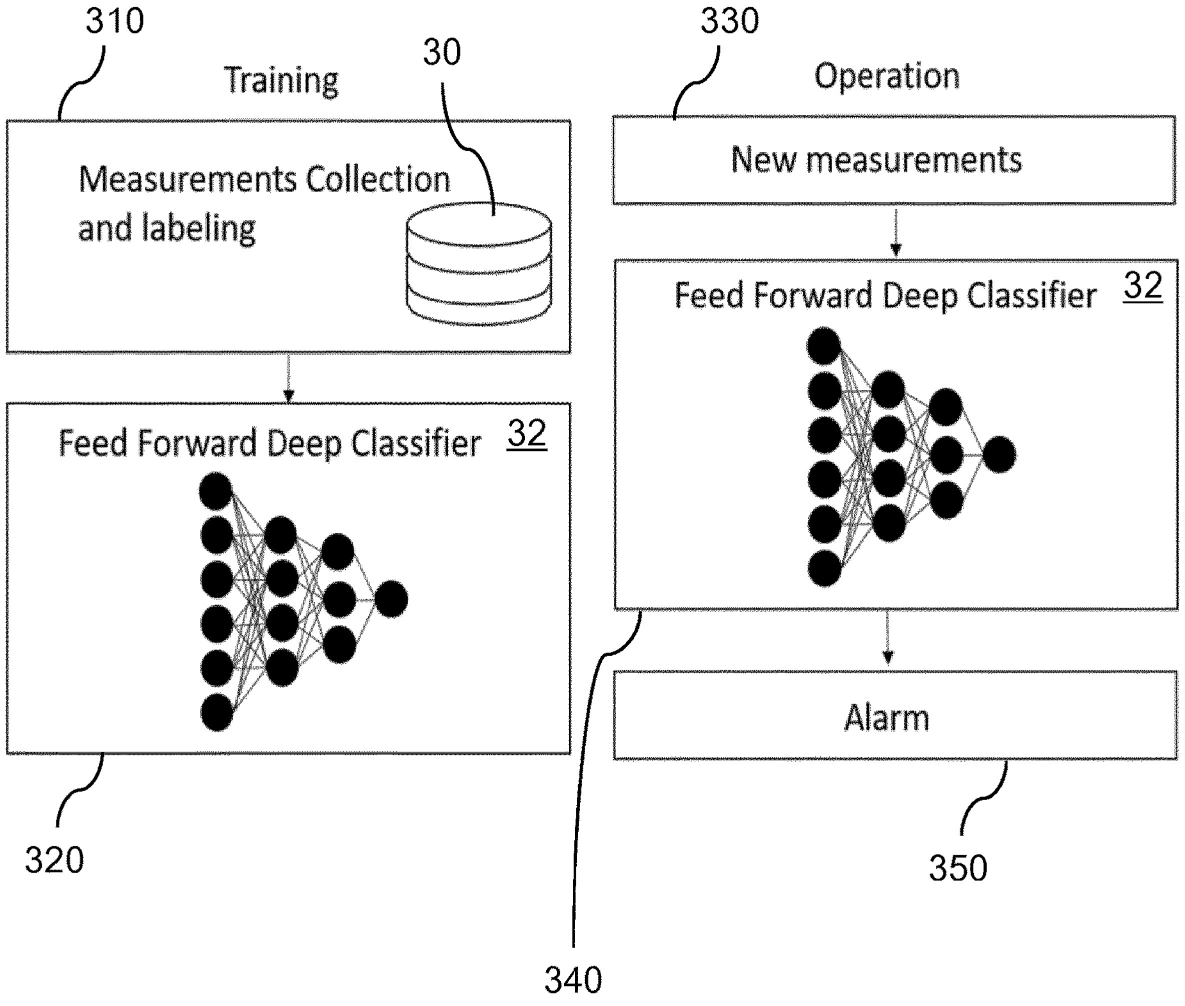
FIG. 3 is a schematic diagram illustrating the general workflow of intrusion detection using a neural network in accordance with embodiments of the invention.

FIG. 3 schematically illustrates a workflow according to an embodiment of the present invention that relates to a system with mm-waves routers deployment to support intrusion detection in indoor environments. Specifically, the embodiment relies on the commercial Wi-Gig devices, namely access points, regularly deployed in an indoor environment. Considering each device with a codebook of 36 different selectable beam configurations for transmission and one beam pattern for reception, the beam training phase may be executed for a pair of devices while collecting RSSI and SNR measurements, as shown at 310. As also shown at 310, such data is organized in a dataset 30 and properly labeled according to the status of the environment, i.e. either undisturbed (i.e. empty environment) or disturbed (i.e. with an intruder in the environment).

As shown at 320, the data collected in the dataset 30 during the beam training phase is used to train a feed forward deep neural network classifier 32, which is in charge of learning the different measurement statistics, both in the case of an empty environment and in the case when an intrusion has occurred. After the training phase, the system is ready to operate. New measurements, collected during regular operation as depicted at 330, are continuously fed in to the classifier 32, as shown at 340. The classifier 32 is in charge of detecting any environmental change and triggering an alarm in case of detecting an environmental change, as shown at 320. The alarm is indicative of an intrusion event.

Figure 4:
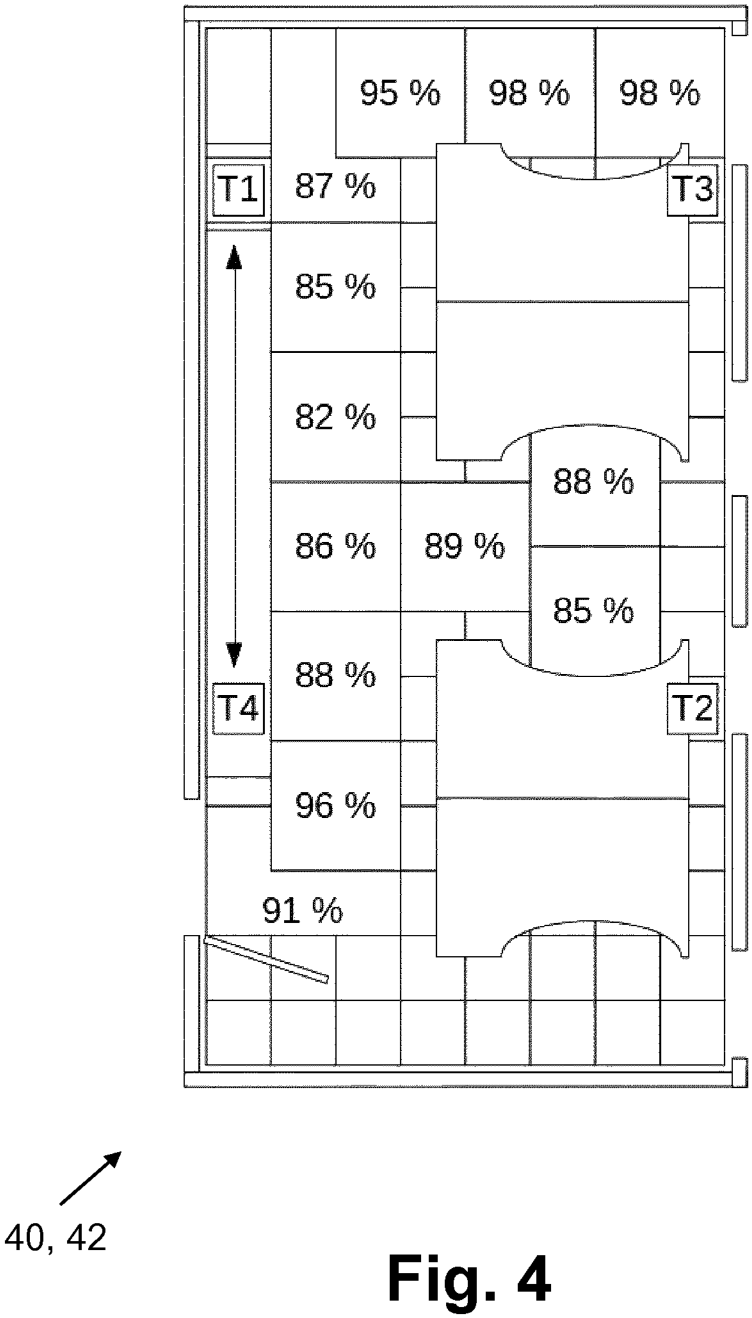
FIG. 4 is a schematic view illustrating a spatial intrusion detection accuracy of an intrusion detection system in accordance with embodiments of the invention.

As an example, schematically shown in FIG. 4, an intrusion detection system in accordance with embodiments of the invention has been implemented using four commercial Tp-Link Talon ad7200 Wi-Gig devices (denoted T1, . . . , T4) that are installed in an indoor environment 40 (which, in the example, is an office space 42). After a short training period using an emulated dummy body on different locations within the office space 42, measurements of the communication channel parameters were continuously executed, triggering an alarm only when an intrusion is detected (i.e. in case of detecting variations in the monitored communication channel parameters).

Specifically, FIG. 4 shows the measured intrusion detection accuracy in such an environment for different areas of the office space 42. In this particular example only routers T3 and T4 (one acting as an access point whereas the other acting as a common Wi-Gig station) are connected and monitoring the office space 42.

Another embodiment of the present invention relates to a system with mm-waves routers deployment to passively localize an intruder in indoor environments. In this context, it is important to note that the highly directional nature of mm-wave communication can provide highly directional channel variation sensing. This means that different beam patterns are capable to sense channel variations caused by different positions of the intruder.

Consequently, according to an embodiment, the directional channel variations are monitored and, based on the monitored variations, the position of an intruder within the indoor environment is inferred. For instance, a deep neural network (for instance, a deep feed forward neural network) may be implemented that takes the power measurements performed during the beam training phase as input and provides an estimation of the position of the intruder within the indoor environment (e.g., the office area of FIG. 4) as output. This embodiment requires as training data the collection of measurements associated with the coordinate (ground truth) of a dummy intruder in the indoor environment, and a training phase of the deep neural network. After this phase, new measurements can be fed into the deep neural network, which provides an estimation of the intruder's position in the office. In an exemplary implementation in an office scenario using 4 commercial Tp-Link Talon ad7200 Wi-Gig devices it was possible to obtain an accuracy of 1.4 meters in a 5×10-square-meters office.

In a preferred embodiment, in order to detect channel anomalies within an indoor reference environment, a mmWave channel monitoring phase is used. In particular, power measurements on an established mmWave link are regularly collected and analyzed to detect unexpected changes. Following the IEEE 802.11ad protocol guidelines, power measurements are regularly performed during the beam training phase, i.e., when two mmWave devices seek for which beam to activate providing the best channel quality.

IEEE 802.11ad (and its evolution 802.11ay) covers many relevant aspects to establish and sustain a communication link between mmWave-enabled devices. To provide the beamforming capabilities, such devices are equipped with electronically steerable antenna arrays controlled by predefined weights vectors included in a codebook that may automatically activate different transmitting and receiving beam patterns. A specific codebook is selected for transmitting or receiving operations to activate the communication and establish the connection.

The beam pattern activation is performed by means of a complex beam forming training phase. During this phase, the so-called initiator transmits sector sweep (SSW) frames, whereas the responder collects power measurements. As soon as the initiator has probed all available beam patterns by selecting available weights vectors in the codebook, in turn, the responder can start the sector sweep procedure letting the initiator collecting power measurements. This procedure is activated during the association phase being periodically repeated to properly adjust the beam selection during the communication and prevent connection disruptions due to an unexpected signal drop. The entire procedure allows to instantaneously obtain a snapshot of the environment by exploiting the spatial diversity while at the same time considering the best communication path to establish the connection.

Note that, due to the millimeter waves high frequency, their propagation is strongly influenced by the environment itself, including human bodies, walls and even glass objects, which can seriously hamper the signal propagation (for reference, see C. Slezak et al.: "Empirical effects of dynamic human-body blockage in 60 GHz communications", in IEEE Communications Magazine, vol. 56, no. 12, pp. 60-66, 2018). Thus, the presence of an intruder in the environment can change the propagation conditions, although it might not completely obstruct the communication path between a pair of mmWave nodes. Notably, intruders might have a strong influence on the propagation environment that translates into relevant changes in the beam training measurements outcome. Therefore, the power measurements performed by mmWave devices during standard operations can be exploited to build a complete sensing map of the propagation environment and promptly capture unexpected variations.

Hereafter, a mmWave communication system is considered that consists of multiple mmWave-enabled 802.11ad devices, which can exchange data while periodically performing the beam training phase according to the 802.11ad guidelines. Embodiments of the invention focus on the effects produced by propagation environment changes onto the received power measured by those devices.

The short wavelength characterizing mmWave propagation translates into a quasi-optical propagation behavior. As a consequence, objects which lie in the propagation environment can provide communication blockages as well as a large number of reflected paths that can sustain the communication, especially in indoor environments. Therefore, embodiments of the invention assume mmWave propagation to be a multi-path communication and describe the communication channel with a geometrical model that takes into account the multi-path profile of the environment as follows: wherein L is the $$H = \sum_{l \in \mathcal{L}} \alpha_l a_{Rx}(\phi_{Rx,l}) a_{Tx}(\phi_{Tx,l})^H,$$

set of paths constituting the multi-path profile, $\alpha_l$ is the complex gain of the l-th path. $a_{Tx}$ and $a_{Rx}$ are the array steering vectors of the transmitting and receiving device, respectively, which account for the physical characteristics of the arrays, while $\Phi_{Tx,l}$ and $\Phi_{Rx,l}$ are the angle of departure and the angle of arrival of the l-th path.

Such devices are provided with a default beam codebook of a set $P=(p_i)$ of weighting vectors. Different weighting vectors identify distinct beam patterns activated by each device. During the beam training phase, each of the weighing vectors in the transmitter and receiver codebooks, namely $P_{tx}$ and $P_{rx}$, are sequentially selected and applied to the steering vector of the devices. Based thereupon, one can define the set of available pairs of beams as follows:

$$B:=\{(i,j)|pi\epsilon Ptx, pj\epsilon Prx\}$$

Considering the activation of a given couple of transmitting and receiving beams (i, j)ϵB, one can describe the overall communication gain g provided by (i, j) as follows:

$$g^{ij}=|p_j^H H p_i|^2,$$

wherein $p_i$□$P_{tx}$ and $p_j$□$P_{rx}$ are respectively the ith and the jth weighting vectors defined in the transmitting and receiving codebooks of the devices.

The activation of different beam couples provides very different overall communication gains as different weighting vectors pi are designed to be directional and therefore to emphasize different communication directions. This enables the spatial diversity in the power measurements campaign considering different directions and covering a 360°-angle from the device perspective.

Devices may periodically perform the beam training phase, wherein beam patterns are sequentially activated to retrieve power measurements so as to select the best beam for sustaining the data transmission. Analytically, per each beam training phase t, one gets a sample of the received power associated to the beam pair (i, j)ϵB:

$$\zeta^{ij}=\Omega_{TX}+G^{ij}+X^{ij}$$

wherein $\Omega_{TX}$ is the transmission power, $G^{ij}$ is the overall communication gain expressed in dB, and $X^{ij}$ is a random variable that takes into account the non-ideality of the communication channel. The samples of the random process $\zeta^{ij}$ for each selected beam pair can be gathered in a matrix $\zeta_t=(\zeta^{ij})$. Based thereupon, the expected mean value μ and variance σ of the received power distribution per each couple (i, j)□B by can be computed, representing the power distribution in the standard environmental conditions, i.e. with no intrusions being present.

In case of an intrusion event that occurs when a person moves inside the propagation environment, embodiments of the invention draw one or more of the following three observations: i) due to the hydrophobic millimeter-wave behavior, the presence of an intruder may completely block some of the paths lϵL between the transmitter and the receiver, ii) the flat surfaces that characterize most of the fixtures in the environment might act as wave reflectors: the intruder might permanently move them thereby disrupting some existing path while building new communication channels, iii) a moving person acting as an intruder continuously moves around intermittently blocking some of the communication paths. Such changes in the propagation environment translate into a tangible multi-path profile change that reflects the modifications of the received power statistics both in terms of average and variance.

According to an embodiment, in order to detect such changes, i.e. unexpected data measurements, a density estimate based on a non-parametric kernel estimate function, namely a ground truth density is performed. For instance, this kernel estimate function may be set up in accordance with the approach described in S. Hawkins et al.: "Outlier detection using replicator neural networks," in Proceedings of the 4th Int. Conf. on Data Warehousing and Knowledge Discovery (DaWaK02). Aix-en-Provence, 2002. In this way, measurement values differing from the ground truth density are labelled as outliers. However, when no assumptions are taken about the distribution of the measurements, outlier detection is only feasible by comparing the estimated density of a given measurement value to the average density of its neighbors, namely unsupervised outlier detection method.

According to a preferred embodiment, while such outlier detection process helps to recognize the next environmental change, the current status of the system is identified based on the data collected within a certain measurement time window in order to trigger an alert for potential intruders. According to embodiments, two main system states may be defined: i) a state 50 "intrusion detected" and ii) a state 52 "no intrusion detected", as shown in the state diagram of FIG. 5.

As will be appreciated by those skilled in the art, the continuous presence of an intruder within the environment may conditionally change the overall power measurements, which may exhibit altered distribution parameters μ and Σ as described above. This would result, in turn, in upcoming power measurements distributed according to the new distribution statistics revealing no further outliers. Therefore, according to embodiments of the invention, the system does not rely only on the outlier detection process to determine the current system state as it might fail while trying to capture diverging behaviors. Instead, a new system state (denoted similarity check 54 in FIG. 5) that accounts for such an intermediate state may be introduced. This state is entered as soon as no further variation is retrieved, i.e., when no power measurement is marked as an outlier.

Figure 5:
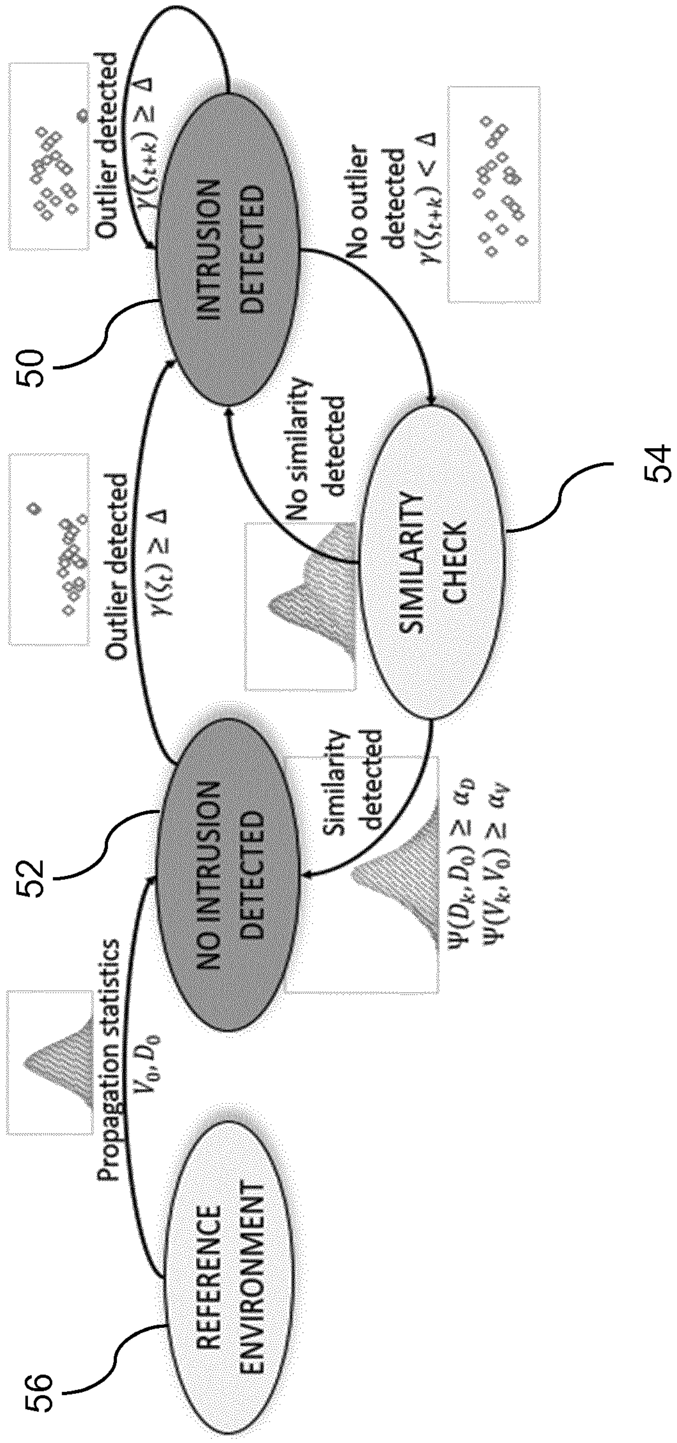
FIG. 5 is a state diagram of an intrusion detection system in accordance with embodiments of the invention.

If no outliers are detected within an entire measurement time window $T_k$, a distribution similarity process is executed. In particular, this process compares the expected mean values μ and variances σ of the received power within the previous measurement time window $T_k$ against the distribution parameters of a reference scenario. The reference measurements distribution strongly depends on the selected environment and are taken in advance when the environment is not occupied by any human presence (labelled as reference environment 56 in FIG. 5). In case the distribution of measurements in $T_k$ is found to be similar to the distribution of measurements taken during the reference scenario, this places the system in the "No intrusion detected" state 52, as shown in FIG. 5. Otherwise, the intrusion state 50 is entered again.

Different applied settings might result in different system behaviors. As such, embodiments of the invention take into account one or more of the following aspects: i) a larger measurement time window $T_k$ might capture better the channel dynamics and properly recognize the outlier, but it might return a biased set of distribution statistics that might impair the overall similarity process; ii) the measured variance shall be weighted higher than the measured mean value as the variance is a meaningful feature that better describes the data distribution, iii) a detection threshold value Δ shall be automatically selected as it may lead to reduce the sensitivity of the system to the possible intrusions (when set to low values) while triggering often an alarm (when set to high values) and, iv) the power measurement statistics is assumed as normally distributed which makes the analysis tractable, deviations on this assumption would affect the solution effectiveness.

Figure 6:
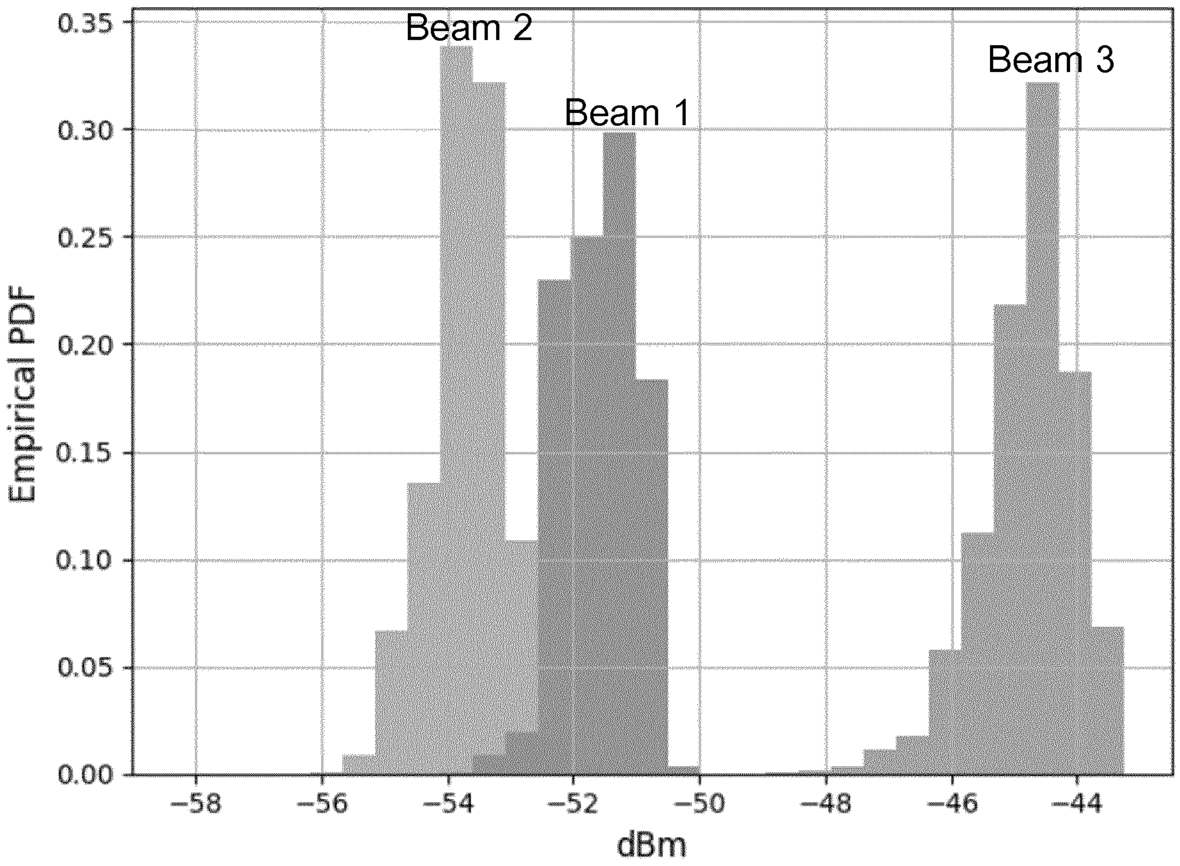
FIG. 6 is a diagram illustrating empirical probability density functions (PDF) of received power measurements in accordance with embodiments of the invention.

Regarding the power measurement statistics assumption of being normally distributed, FIG. 6 shows the empirical probability density function (PDF) of power measurements taken with real devices for three different beams in a room with no intruders. As it can be observed, although the multiple beams exhibit different distributions showing how the spatial diversity affects the mmWave communication channels, they can be reasonably mapped to normal distributions with different variance and mean values based on the selected transmission beam.

The intrusion detection solution described so far effectively works for static scenarios where intruders enter an area without modifying the environment. However, when considering an intruder considerably changing the structure of the indoor environment (e.g., moving furniture or introducing new static objects) the reference environment may significantly change its power measurements distribution leading to a ping-pong effect between the "intrusion detected" and "similarity check" system states. In such a case, even though the room might have no intruders anymore and no outliers are detected, the power measurements distribution within the last measurement interval $T_k$ may differ from the reference scenario in $T_0$. To overcome this problem and make the solution able to dynamically learn about room structure changes, embodiments of the invention introduce a machine-learning module responsible of updating the reference environment when required.

To make the intrusion detection solution robust to indoor mmWave environment changes, a machine learning-based solution may be realized which, by means of a training process, is able to automatically approximate the system model described above. The advantage of a self-learning approach versus a parametric model-based solution is multifold: i) the distribution of the power measurements can radically change according to the specific deployment environment, thus the setting parameters have to be properly tuned for each indoor environment to successfully detect intrusions; ii) the indoor environment structure can change (e.g., furniture moved), resulting in a new reference environment that must be identified preventing the system to enter into a deadlock between the non-intrusion and similarity check states; iii) the multivariate Gaussian assumption of the power measurements might not hold if the number of transmission paths is not sufficiently high or in case of non-linearity in the devices' power measurement unit.

Figure 7:
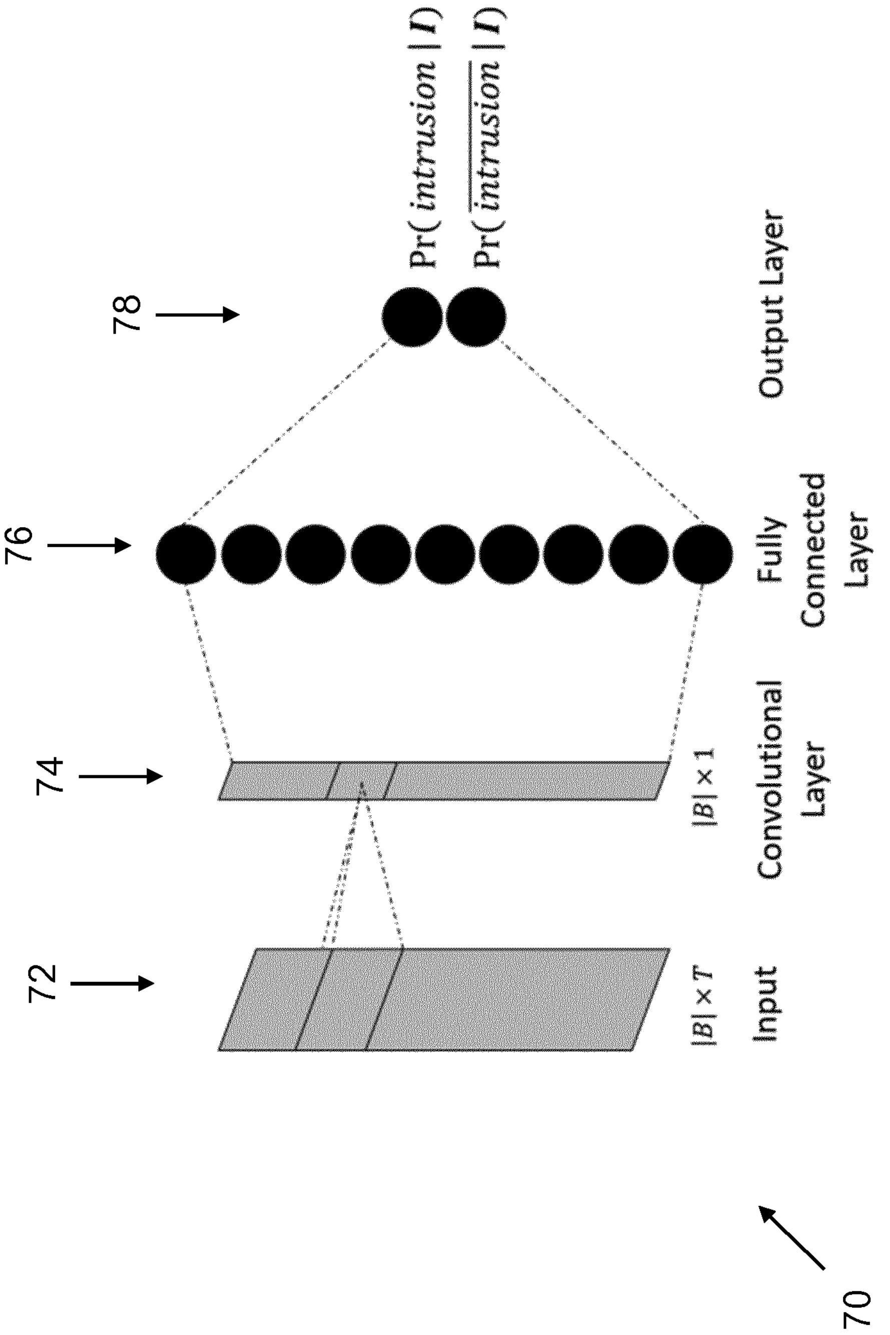
FIG. 7 is a schematic view illustrating a neural network architecture employed in accordance with embodiments of the invention.

As According to embodiments of the invention, a deep convolutional neural network classifier architecture 70 is adopted, as depicted in FIG. 7. For each time interval k, a set of power measurements $S_k$ taken within measurement time window $\tau_k$ is organized as a matrix $I_k \in \mathbb{R}^{B\times T}$ (forming the input 72) such that columns of $I_k$ contain the measurements vector $\zeta_t$ at the time $t \in \tau$, whereas rows represent the temporal evolution of each element of $\zeta_t$ within the measurement time window $\tau_k$. The convolutional layer 74 has a kernel with T×1 size and it is used to reduce the dimensionality of the input layer 72. Given the dimensions of the kernel, one can write the output of the convolutional layer 74 as the following:

$$f_k = y(I_k \cdot w),$$

wherein $f_k=(f_k^{(i,j)})$ is relative to each beam couple $(i,j)) \in B$, y(•) is the relu activation function and w is the set of weights of the convolutional layer 74. The idea is to exploit the convolutional layer 74 to find an ad-hoc weighting vector w, which is able to translate the temporal evolution of $\zeta_t$ into a lower dimensional feature space that represents the intrusion phenomena and, at the same time, keeps separated the contributions of each couple $(i,j) \in B$. The output of the convolutional layer 74 is a vector with B×1 size. According to an embodiment, this vector is fed into a deep fully connected neural network comprising a 9-neurons layer 76 followed by a 2-neurons output layer 78 with relu and softmax activation functions, respectively. Such layers 76, 78 carry out the classification process. Additionally, the output neurons provide a score, which represents the conditioned probabilities $\Pr(\text{intrusion}|I_k)$ and $\Pr(\overline{\text{intrusion}}|I_k)$ by means of the soft-max activation function. Therefore, the output neuron that maximizes the score represents the chosen output class inferred by the system.

An aspect of the presented neural network 70 embodiment is that, if the training set is provided with a sufficiently different number of indoor scenarios, the convolutional layer 74 can learn to extract features which are relevant to detect intrusion events independently on the environment itself. The variety of the training data affects also the classification part of the network that is able to generalize the classification process. This translates into a system which is portable and does not require an initial adaptation to the specific area of interest as long as the mmWave devices relative positioning is kept.

Embodiments of the present invention also relate to intruder localization within an area under surveillance. Given the directional nature of the mmWave communication, it is possible to exploit the measurements taken during the beam training phase to sense the propagation environment towards specific directions. Specifically, one can, alongside the intrusion detection, map the changes sensed by the different beams onto the (potential) location of the intruder inside the area of interest (e.g., within the office).

An embodiment of the invention relates to implementing a variation of the neural network-based solution. First, it is important to note that in the context of intruder localization, there is no interest in the temporal evolution of the received power. Conversely, it is assumed that an intrusion occurred, hence, the method should aim at mapping in the received power measurements into the location of the intruder in the area. This can be achieved by adopting a different neural network architecture with respect the one described above. Specifically, embodiments consider a deep neural network with an input layer with the dimensionality of the vector f, followed by an L-neurons hidden layer and a 2-neurons output layer. As activation functions, tan h may be selected for the hidden layer and linear for the output one.

Figure 8:
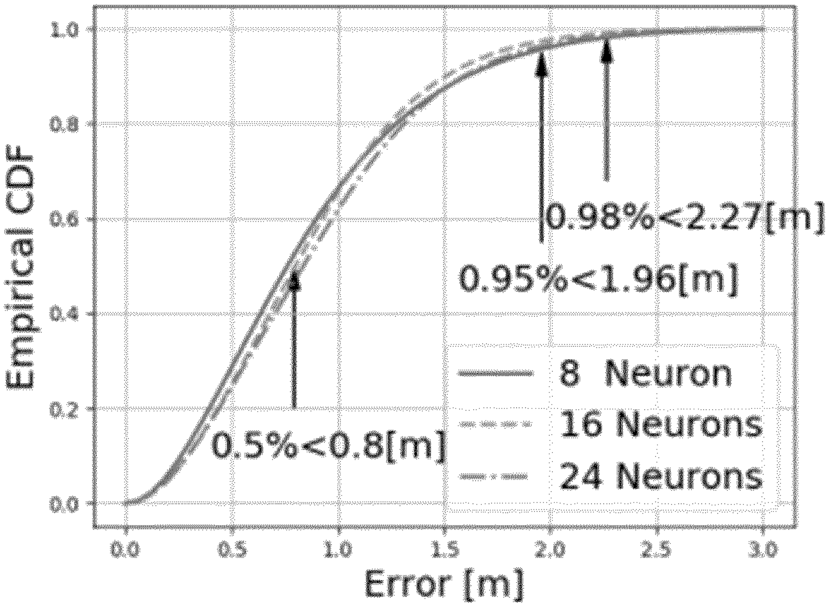
FIGS. 8(*a*) and 8(*b*) are a diagram showing a cumulative distribution function of an intruder localization error.
Figure 8:
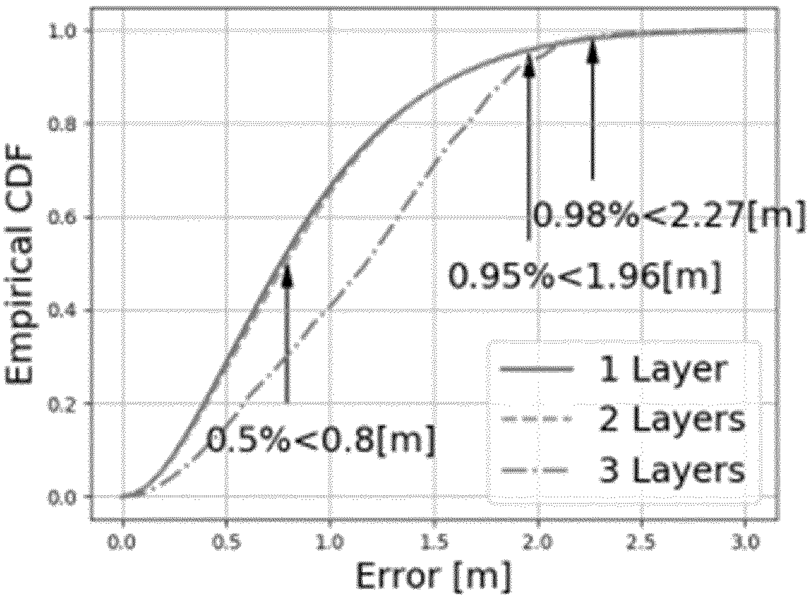

FIG. 8 depicts the obtained results after having trained neural network with a batch size of 1000, a number of 100 epochs, a learning rate of 0.0001 and Adam optimizer. FIG. **8*a* shows the intruder localization performances with 1 hidden layer network with different number of neurons, while FIG. 8*b*** shows the localization performances achieved by keeping the hidden layer size at 8-neurons and changing the depth of the network. Results are showing that localization performances can be achieved with a sub-meter precision for the 70% of the cases, and that increasing the complexity of the network does not help to improve localization performances. Therefore, low complexity architecture which can fit in the limited hardware of commercial off-the-shelf devices is sufficient to effectively exploit directional power measurements to estimate the intruder location.

Embodiments of the present invention disclosed may relate to one or more of the following aspects:

- analytical modeling of mmWave channel variation outliers detection by monitoring and analysis of gathered power measurements;

distribution similarity process comparing regularly obtained sample channel monitoring measurements against a reference environment without intruders;

design of a deep neural network that continuously keeps track of real-time channel measurements and triggers an alert message when an intrusion is detected;

localization of intruders within a given indoor reference channel environment;

implementation of an intrusion detection mechanism as a stand-alone software running in off-the-shelf mmWave routers and feasibility validation in an office scenario.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for passively detecting intrusion in an indoor environment, the method comprising:

establishing at least one wireless communication channel between two millimeter (mm)-wave devices of a plurality of mm-wave devices deployed within the indoor environment, continuously monitoring communication channel parameters of the at least one communication channel, and triggering an intrusion detection process based on variations of the communication channel parameters.

2. The method according to claim 1, wherein the mm-wave devices have directional communication capabilities through activation of different transmitting and receiving beam patterns, and wherein the at least one communication channel is established through a pair of beams that are activated during the communication.

3. The method according to claim 1, wherein establishing the at least one communication channel is based on a beamforming alignment process performed during a beam training phase.

4. The method according to claim 1, wherein monitoring communication channel parameters comprises at least one of power measurements, received-signal-strength-indicator (RSSI) measurements, or signal-to-noise- ratio (SNR) measurements.

5. The method according to claim 1, the method further comprising:

directionally sensing the propagation environment based on power measurements performed by the mm-wave devices during a beam training phase.

6. The method according to claim 1, the method further comprising:

adaptively learning, by a neural network, a statistical distribution of the communication channel parameters; and identifying, by the neural network, variations of the communication channel parameters.

7. The method according to claim 6, wherein the neural network is trained with statistical measurement results of the communication channel parameters in a reference scenario with no disturbing influences being present within the indoor environment as well as when the indoor environment is occupied by one or more intruders.

8. The method according to claim 1, the method further comprising:

performing directional channel variation sensing based on a directional nature of mm-wave communication , and based on the monitored directional channel variations, inferring a position of an intruder within the indoor environment.

9. The method according to claim 1, the method further comprising:

mapping a discovered variation of the communication channel parameters onto one or more specific emergency situations.

10. The method according to claim 1, wherein triggering the intrusion detection process comprises generating an alarm.

11. A system for passively detecting intrusion in an indoor environment, a plurality of millimeter (mm)-wave devices being deployed within the indoor environment, and at least one wireless communication channel being established between two mm-wave devices of the plurality of mm-wave devices, the system comprising a controller comprising one or more processors, which, alone or in combination, are configured to provide for execution of the following steps:

continuously monitoring communication channel parameters of the at least one communication channel, and triggering an intrusion detection process based on variations of the communication channel parameters.

12. The system according to claim 11, wherein the mm-wave devices have directional communication capabilities through activation of different transmitting and receiving beam patterns, and wherein the at least one communication channel is established through a pair of beams that are activated during the communication.

13. The system according to claim 11, further comprising a data analytics engine that is configured to parse the monitored communication channel parameters and to capture mmWave channel variations.

14. The system according to claim 11, further comprising a deep neural network that is configured to automatically learn a reference channel environment of a given mmWave indoor deployment and, based upon detecting an unexpected channel variation, recognize whether it is due to the presence of an intruder.

15. The system according to claim 14, wherein the neural network is trained with statistical measurement results of the communication channel parameters in a reference scenario with no disturbing influences being present within the indoor environment as well as when the indoor environment is occupied by one or more intruders.

16. The method according to claim 1, wherein the plurality of mm-wave devices comprises at least two routers each having a plurality of mmWave antennas.

* * * * *